United States Patent
Le Pechour et al.

(10) Patent No.: US 9,296,147 B2
(45) Date of Patent: Mar. 29, 2016

(54) METHOD FOR COOLING A MOULD BY CIRCULATING A HEAT-TRANSFER FLUID IN CONTACT WITH THE EXTERNAL FACE THEREOF

(71) Applicant: SIDEL PARTICIPATIONS, Octeville sur Mer (FR)

(72) Inventors: Anthony Le Pechour, Octeville sur Mer (FR); Laurent Fouet, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/010,783

(22) Filed: Aug. 27, 2013

(65) Prior Publication Data

US 2014/0065256 A1    Mar. 6, 2014

(30) Foreign Application Priority Data

Aug. 28, 2012  (FR) ...................... 12 58026

(51) Int. Cl.
*B29C 49/48* (2006.01)
*B29C 49/28* (2006.01)
*B29L 31/00* (2006.01)

(52) U.S. Cl.
CPC ............... *B29C 49/28* (2013.01); *B29C 49/48* (2013.01); *B29C 2049/4828* (2013.01); *B29C 2049/4858* (2013.01); *B29C 2049/4864* (2013.01); *B29L 2031/7158* (2013.01)

(58) Field of Classification Search
CPC ............ B29C 49/4823; B29C 49/4252; B29C 2049/4828; B29C 2049/4841
USPC .......... 249/78; 425/526; 264/39, 523; 65/267
See application file for complete search history.

(56) References Cited

U.S. PATENT DOCUMENTS

| | | | | |
|---|---|---|---|---|
| 3,020,595 A | * | 2/1962 | Szajna | 249/79 |
| 3,233,416 A | * | 2/1966 | Rainwater et al. | 62/5 |
| 3,838,997 A | * | 10/1974 | Becker et al. | 65/29.19 |
| 5,234,637 A | * | 8/1993 | Reymann et al. | 264/40.6 |
| 5,766,299 A | * | 6/1998 | Miller | 65/261 |
| 5,968,560 A | | 10/1999 | Briere et al. | |
| 5,993,721 A | * | 11/1999 | Kurihara et al. | 264/402 |

(Continued)

FOREIGN PATENT DOCUMENTS

| | | |
|---|---|---|
| CN | 1434762 | 8/2003 |
| EP | 0 821 641 B1 | 8/2000 |

(Continued)

OTHER PUBLICATIONS

French Search Report, dated May 17, 2013, from corresponding French application.

*Primary Examiner* — Robert B Davis
(74) *Attorney, Agent, or Firm* — Young & Thompson (57) ABSTRACT

Method and apparatus for cooling a heated mold (12, 14, 16) of a device (10) for blow-molding thermoplastic containers, the device including:
 a mold (12, 14, 16) having an internal face which delimits a molding cavity (18) and which includes an external face (20, 28) which surrounds the molding cavity (18);
 heating elements for heating the mold to a determined temperature and which are deactivated when the cooling method is implemented;
characterized in that the mold (12, 14, 16) is cooled by circulating heat-transfer fluid directly in contact with the external face (20, 28) thereof.

16 Claims, 6 Drawing Sheets

(56) References Cited

U.S. PATENT DOCUMENTS

| | | |
|---|---|---|
| 6,875,396 B1 | 4/2005 | Limanjaya |
| 2002/0162940 A1* | 11/2002 | Frul et al. ......................... 249/79 |
| 2003/0077351 A1* | 4/2003 | Ryan et al. .................... 425/526 |
| 2007/0026098 A1 | 2/2007 | Lemaistre et al. |
| 2008/0136068 A1* | 6/2008 | Leone ........................... 264/520 |
| 2008/0258353 A1* | 10/2008 | Hutchinson et al. ........... 264/483 |
| 2010/0170659 A1* | 7/2010 | Maguire .................. 165/104.19 |
| 2010/0230575 A1* | 9/2010 | Mironov ......................... 249/78 |
| 2011/0165285 A1 | 7/2011 | Lane |

FOREIGN PATENT DOCUMENTS

| | | |
|---|---|---|
| FR | 2 856 333 A1 | 12/2004 |
| JP | 58072425 A * | 4/1983 |
| WO | WO 9933634 A1 * | 7/1999 |
| WO | 2005/002820 A1 | 1/2005 |
| WO | WO 2011091780 A2 * | 8/2011 |
| WO | 2012/096820 A2 | 7/2012 |

\* cited by examiner

METHOD FOR COOLING A MOULD BY CIRCULATING A HEAT-TRANSFER FLUID IN CONTACT WITH THE EXTERNAL FACE THEREOF

FIELD OF THE INVENTION

The invention relates to a method for cooling a heated mould of a device for blow-moulding thermoplastic containers.

The invention relates more specifically to a method for cooling a heated mould of a device for blow-moulding thermoplastic containers, the device comprising:

a mould having an internal face which delimits a moulding cavity and which comprises an external face which surrounds the moulding cavity;

heating means for heating the mould to a determined temperature and which are deactivated when the cooling method is implemented.

BACKGROUND OF THE INVENTION

In the known way, moulding devices of this type can be used to create containers, such as bottles, from thermoplastic preforms. The preforms are preheated to a glass transition temperature to make them sufficiently malleable. The preform thus heated is inserted into the moulding cavity, then a blow nozzle injects a pressurized blow-moulding fluid, generally air, into the preform so that the walls of the latter conform to the impression delimited by the moulding cavity.

When the plastic containers have to be filled with a hot liquid, a container moulded at an ambient temperature carries the risk of container shrinkage and deformation. To avoid this shrinkage phenomenon, the mould has to be heated to a determined temperature, for example between 130° C. and 180° C., during the moulding operation in order to make the plastic of which the container is made heat resistant.

Various ways of heating the mould are already known. Thus, it is known practice to heat the mould using a fluidic circuit created within the thickness of the mould. A hot heat-transfer fluid is fed into the circuit in order to heat the mould.

It is also known practice to arrange heating electrical resistances within the thickness of the mould in order to heat the mould electrically.

Certain operations require an operator to handle the mould. Such is the case for example when there is a change in format of container to be manufactured. However, the operator cannot handle the mould while it is still hot and it is not a viable option to wait for the mould to cool down passively, thus bringing the entire production line to a standstill.

In order to solve this problem, it is known practice to use mould cooling means.

Thus, when the mould is heated by a hot heat-transfer fluid circuit, it has already been proposed that the hot heat-transfer fluid be temporarily replaced with cold heat-transfer fluid. Such a method allows the mould to be cooled rapidly.

The manufacture of a mould equipped with a heat-transfer fluid circuit devoted to cooling is extremely expensive and complicated to achieve because of the presence of the heating resistances within the thickness of the mould.

SUMMARY OF THE INVENTION

The invention proposes a cooling method of the type described hereinabove, characterized in that the mould is cooled by circulating a cold heat-transfer fluid directly in contact with the external face thereof.

According to other features of the method:

the heat-transfer fluid is formed of a pressurized gas which underdoes an expansion as it circulates against the external face of the mould;

the heating means are formed by electrical resistances which are interposed in the thickness of the mould between the moulding cavity and the external face.

The invention also proposes a moulding device for implementing the method according to the teachings of the invention, in which:

the mould is formed by the union of two half-moulds each comprising a union face in which part of the moulding cavity is formed and an opposite external face that forms part of the external face of the mould;

each half-mould is fixed in a housing of an associated support with an empty space reserved between the bottom of the housing and the external face of the half-mould;

characterized in that the moulding device comprises at least one controlled heat-transfer fluid feed duct which opens into the empty space to allow the heat-transfer fluid to circulate between the external face of the half-mould and the bottom of the housing.

According to other features of the device:

the empty space is open to the atmosphere to allow the heat-transfer fluid to be discharged;

the feed duct opens into the bottom of the housing;

the feed duct comprises several orifices opening into the bottom of the housing, the orifices being distributed over the said bottom;

the feed duct is produced in the thickness of the support.

BRIEF DESCRIPTION OF THE DRAWINGS

Further features and advantages will become apparent during the reading of the detailed description which follows, for the understanding of which reference will be made to the attached drawings among which.

DETAILED DESCRIPTION OF THE INVENTION

In the remainder of the description, elements that have an identical structure or analogous functions will be denoted by the same reference numerals.

The following orientations will be adopted nonlimitingly in the remainder of the description:

longitudinal indicated by the arrow "L" and directed from the rear forwards;

vertical indicated by the arrow "V" and directed from the bottom upwards;

transverse indicated by the arrow "T" and directed from left to right.

In addition, the terms "axial" and "radial" will be used with reference to the axis "A".

Figure 1:
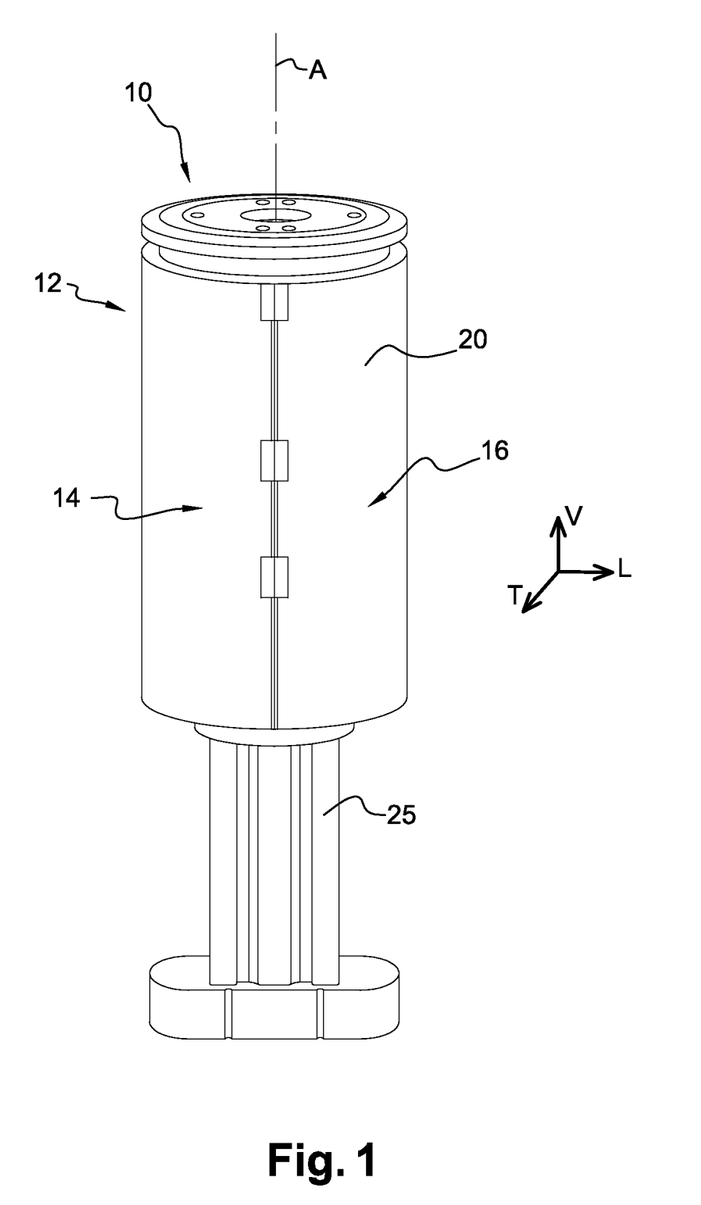
FIG. 1 is a perspective view depicting a mould of a moulding device created according to the teachings of the invention.

FIG. 1 depicts a device 10 for manufacturing containers by blow-moulding or by stretch-blow-moulding. This device 10 comprises a mould 12 formed by the union of two substantially symmetric half-moulds 14, 16 made of a metallic material, for example of steel or of an aluminium alloy.

Figure 2:
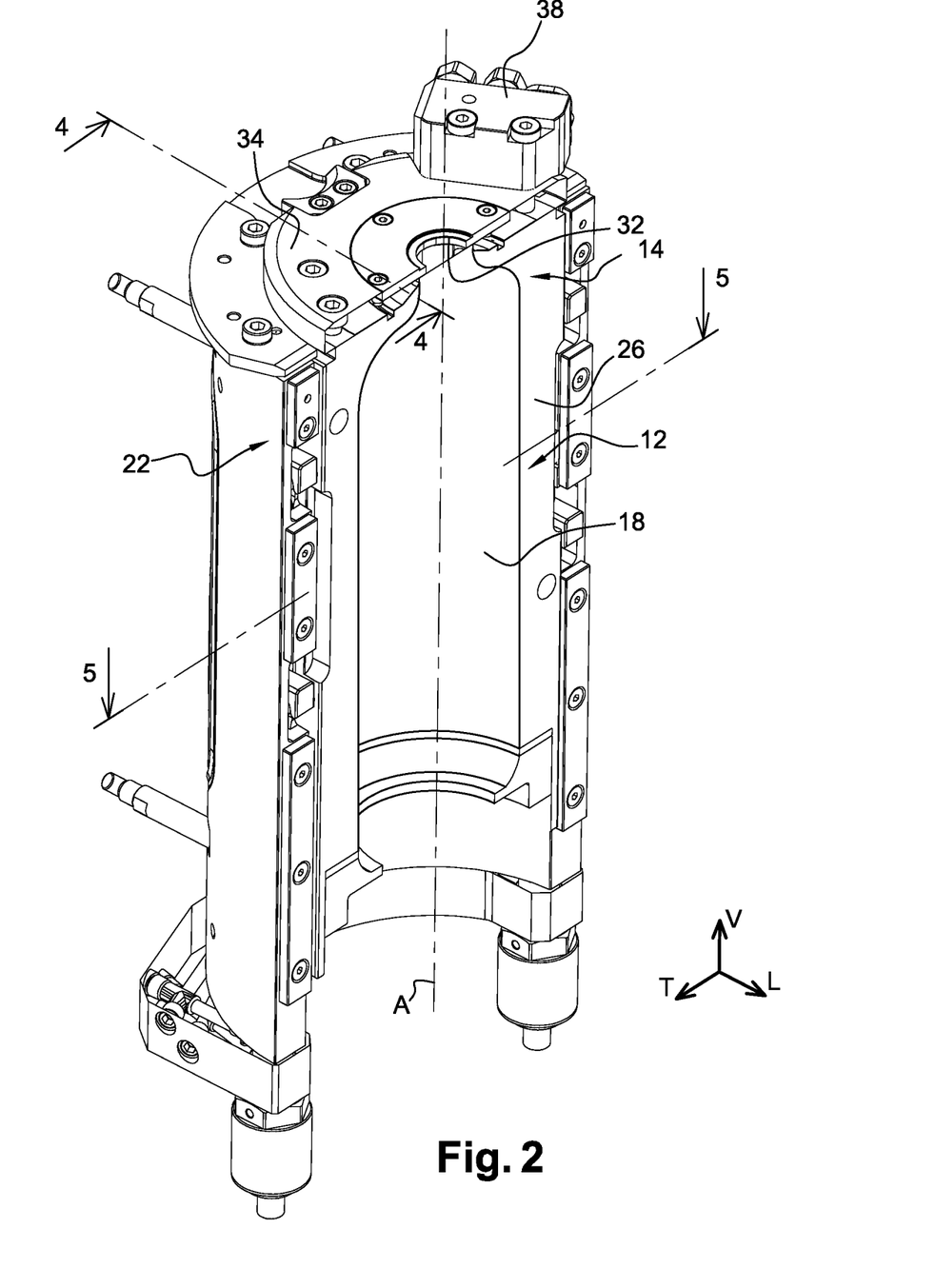
FIG. 2 is a perspective view depicting a moulding device created according to the teaching of the invention and comprising a half-mould mounted in an associated support.

The mould 12 thus assembled has the overall shape of a hollow cylinder of revolution of vertical main axis "A". As depicted in FIG. 2, the mould 12 comprises an internal face which delimits a moulding cavity 18 which opens axially towards the top so that the neck of a preform (not depicted) can pass through it. The mould 12 is radially delimited by an external face 20 which surrounds the moulding cavity 18.

Each half-mould 14, 16 is carried by an associated support 22, 24.

The half-moulds 14, 16 are articulated along a hinge (not depicted) of vertical axis so as to allow the mould 12 to be opened so that a preform can be introduced into it. A mould bottom 25, depicted in FIG. 1, is interposed between the two half-moulds 14, 16 to form the bottom of the container. The overall structure of such a mould 12, referred to as a hinged mould, is described in French Patent Application FR-A1-2.856.333 and in the corresponding International Application WO-A1-05/002.820, both in the name of the applicant company and to which a person skilled in the art may refer.

Since the two half-moulds 14, 16 and their support 22 are substantially identical, only the half-mould 14 and its support 22 will be described hereinafter with reference to FIGS. 2 to 6, the description being symmetrically applicable to the other half-mould 16 and to its support 24.

Figure 3:
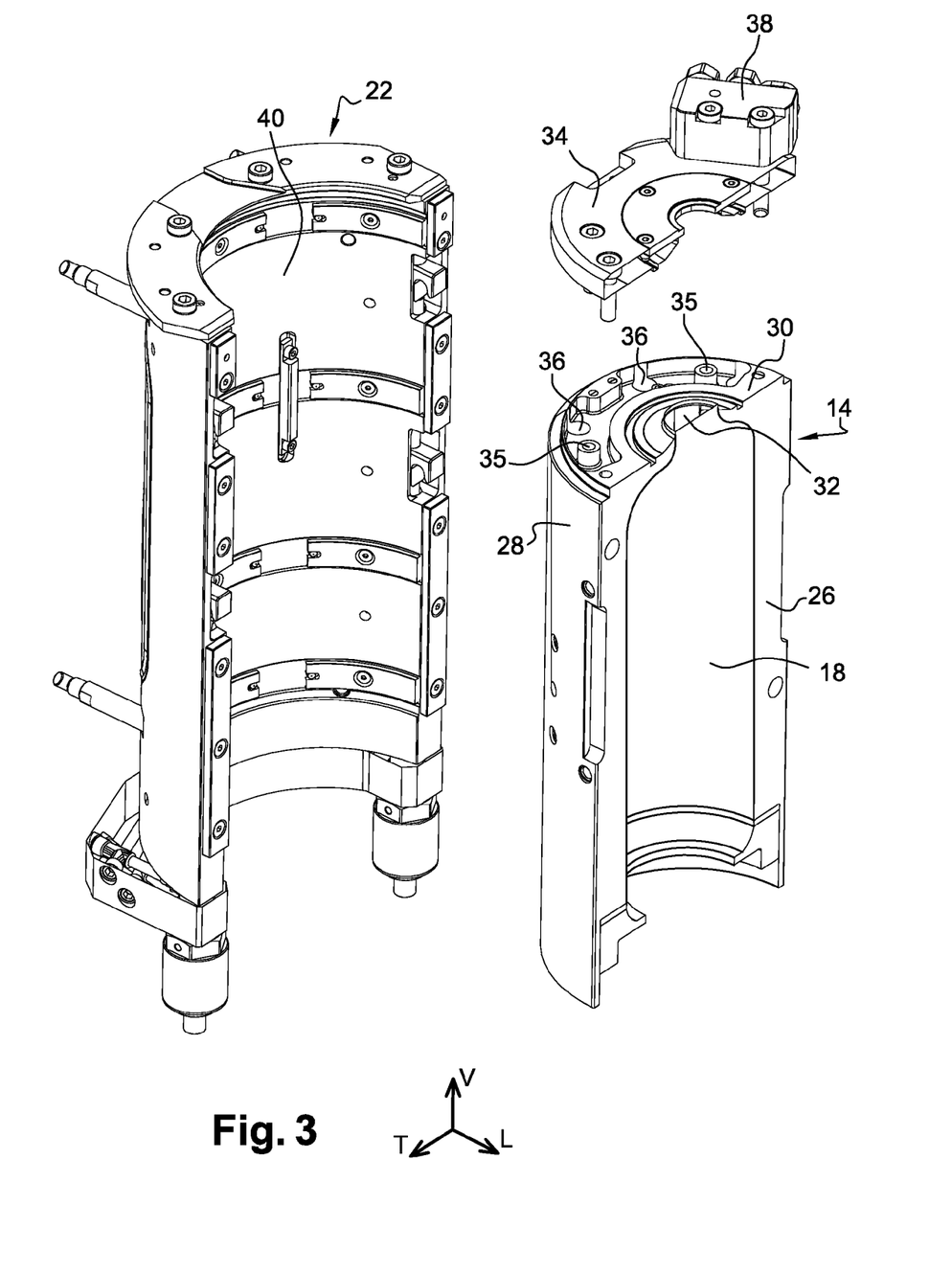
FIG. 3 is an exploded perspective view depicting the half-mould of FIG. 2 and its support.

The half-mould 14 has a semi-cylindrical shape. It thus has a planar front union face 26 in which half of the moulding cavity 18 is formed, and an opposite semi-cylindrical external face 28 that forms half of the external face 20 of the mould 12, as illustrated in FIG. 3.

If reference is made once again to FIG. 3, the half-mould 14 also has an upper face 30 in the form of half a disc. The straight edge of the upper face 30 has a cut-out 32 intended to form an orifice through which the neck of the preform inside the cavity 18 can pass.

A mounting plate 34 of complementary shape is fixed to the upper face 30 of the half-mould 14. The upper face of the mounting plate 34 forms a support face for a nozzle (not depicted) carrying pressurized air by virtue of which the container is blow-moulded.

The half-mould 14 comprises controlled means for heating the mould to a determined temperature. More specifically, the heating means here are formed by heating electric resistances 35 which are interposed within the thickness of the half-mould 14 between the moulding cavity 18 and the external face 28.

Figure 4:
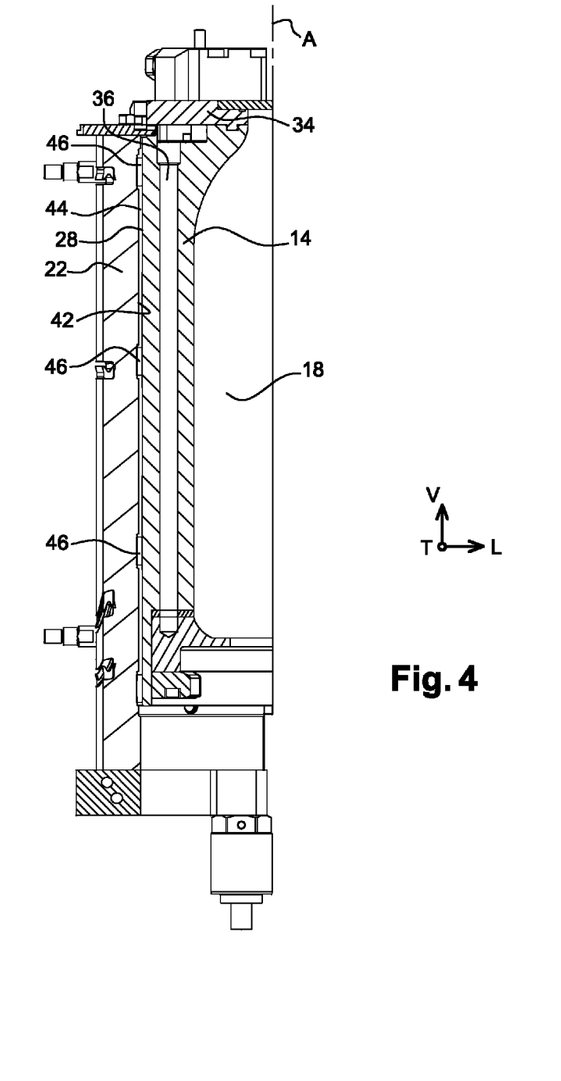
FIG. 4 is a view in vertical section on the plane of section 4-4 of FIG. 2, depicting the space left between the mould and its housing in the support.

For this, the half-mould 14 comprises a plurality of vertical orifices 36 which open at the top into the upper face 30 of the mould, as can be seen in FIGS. 3 and 4. The resistances are thus introduced into the orifices 36. The mounting plate 34 covers the orifices 36 to enclose the resistances therein. The electrical resistances are supplied with electricity by electric wires (not depicted) which are sandwiched between the mounting plate 34 and the upper face 30 of the half-mould 14. Each wire is connected to a connector 38 which in this instance is borne by the mounting plate 34 so that the heating resistances can receive a controlled supply of electricity.

The half-mould 14 is housed in a housing 40 which is made in a front face of the associated support 22, as depicted in FIG. 3. The housing 40 has a bottom 42 which faces forwards and which has a shape that complements the shape of the external face 28 of the half-mould 14. The half-mould 14 is intended to be fixed removably into the housing 40 of the support 22 so that changes of mould 12, notably when the manufacturer wishes to change the format or shape of the end container, can be made.

The removable attachment is achieved using means that are already well known. One exemplary embodiment of such attachment means is described and depicted in document EP-B1-0.821.641.

The half-mould 14 needs to be kept hot. To avoid heat loss, as depicted in FIG. 4, it is known practice to leave an empty space 44 between the bottom 42 of the housing and the external face 28 of the half-mould 14 by interposing spacer pieces 46 between the half-mould 14 and the bottom 42 of the housing 40. The spacer pieces 46 here are attached to the bottom 42 of the housing 40.

This space 44 is usually filled with stationary air forming a thermally insulating layer. Advantageously, the spacer pieces 46 offer a more reliable possible area of contact with the external face 28 of the half-mould 14 for minimizing heat loss by conduction. For the same reasons, the spacer pieces 46 are advantageously made of a thermally insulating material.

The empty space 44 is made as one piece, i.e. the spacer pieces 46 do not divide it into several separate parts.

Figure 5:
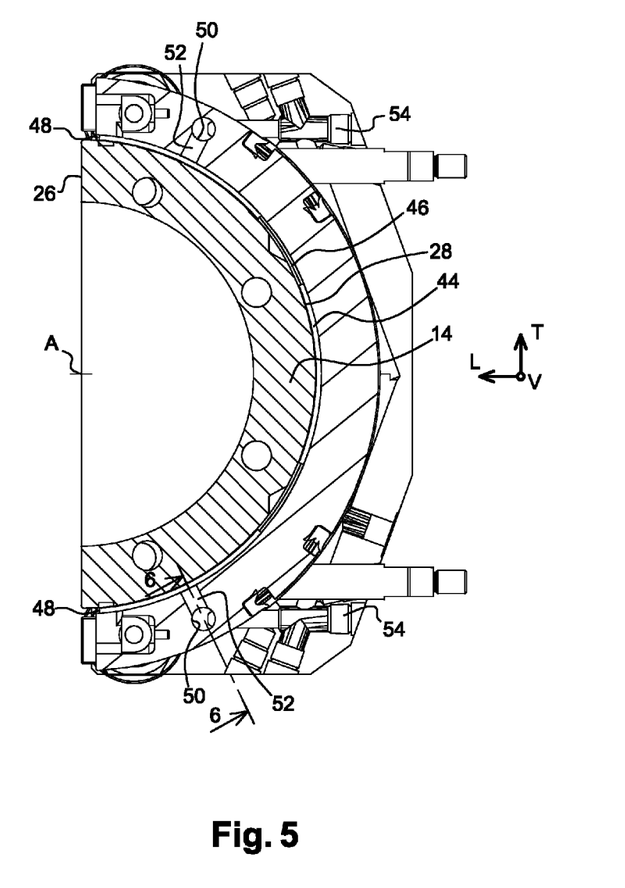
FIG. 5 is a view in horizontal section on the plane of section 5-5 of FIG. 2, depicting open-ended orifices of the supply duct.

The empty space 44 is not fluidtight, thus it can communicate with the outside, notably via the front gaps 48 formed between the vertical edges of the union face 26 of the half-mould 14 and the vertical edges of the housing 40 as depicted in FIG. 5.

When the heating means are activated they heat the half-mould 14 to a temperature that is too high for an operator to be able to handle it bare handed. The temperature of the half-mould 14 is, for example, in excess of 100° C.

When the half-moulds 14, 16 need to be handled, it is therefore preferable to deactivate the heating means. Nonetheless, this operation is not enough because the passive cooling of the half-mould 14 is a very slow process.

The invention therefore proposes a method for actively cooling the half-mould 14. This method is implemented after the heating means have been deactivated.

According to this method, the half-moulding 14 is cooled by circulating a cold heat-transfer fluid directly in contact with the external face 28 thereof. The heat-transfer fluid in this instance circulates in the empty space 44.

To do this, at least one controlled heat-transfer fluid feed duct 50 opens directly into the empty space 44 to allow the heat-transfer fluid to be circulated between the external face 28 of the half-mould 14 and the bottom 42 of the housing 40. In the example depicted in FIG. 5, the support 22 comprises two parallel feed ducts 50.

Each feed duct 50 here extends vertically within the thickness of the support 22, parallel to the bottom 42 of the housing 40. Each feed duct 50 is positioned near to a vertical lateral edge of the housing 40.

Figure 6:
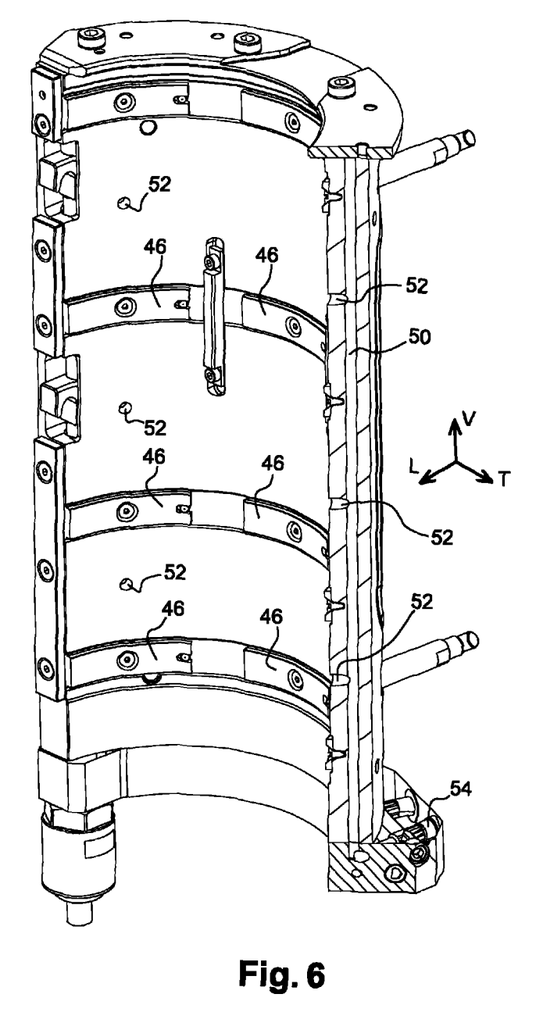
FIG. 6 is a view in section on the plane of section 6-6 of FIG. 5, depicting the supply duct extending into the thickness of the support.

Each feed duct 50 comprises at least one orifice 52 opening into the bottom 42 of the housing 40. Each feed duct 50 here comprises three orifices 52 opening out as depicted in FIG. 6. The orifices 52 are evenly distributed over the said bottom 42 along the vertical axis "A".

Each orifice 52 is here arranged vertically between two spacer pieces 46 so as to allow an even distribution of the stream of heat-transfer fluid despite the presence of the spacer pieces 46.

Each feed duct 50 is connected to a source or heat-transfer fluid via connecting means 54 which are arranged at a lower end of the support 22.

The heat-transfer fluid here is formed by a pressurized gas which is discharged into the atmosphere by passing through the gaps 48. The pressurized gas in this instance is compressed air, for example at between 8 bar and 40 bar.

The gaps 48 have a passage cross section that is large enough that the pressurized gas is made to expand as it circulates against the external face 28 of the half-mould 14. This expansion causes a drop in the temperature of the gas thereby encouraging rapid cooling of the half-mould 14 by conducting heat from its external face 28 to the gas.

This allows the heat of the half-mould 14 to be removed into the atmosphere very rapidly.

The method is advantageously implemented with the two half-moulds 14, 16 parted from one another to allow the heat-transfer fluid to be discharged at maximum flow rate.

The device and the method for implementing it can thus effectively cool hot moulds 12. For example, by using compressed air at 8.5 bar as the heat-transfer fluid, it is possible to cool several moulds 12 in under 15 minutes at a very low cost because of the relatively low pressure of the heat-transfer fluid.

By increasing the pressure of the heat-transfer fluid it is of course possible to shorten the time taken to cool the moulds 12 even further. This is because the flow rate of heat-transfer fluid can be increased and it is possible to obtain a heat-transfer fluid that is very cold because of the great amount of expansion it has undergone.

Furthermore, the external face 28 of the half-mould 14 has a larger surface area than the internal face of the cavity 18. Thus, by circulating the heat-transfer fluid against the external face 28 of the half-mould 14, it is possible to benefit from a larger area of contact between the heat-transfer fluid and the half-mould 14. The removal of heat by conduction is thus greater than it would be if the heat-transfer fluid was circulated inside the moulding cavity 18.

The invention claimed is:

1. Method for cooling a heated mould (12, 14, 16) of a device (10) for blow-moulding thermoplastic containers, the device comprising:
    a mould (12, 14, 16) having an internal face which delimits a moulding cavity (18) and which comprises an external face (20, 28) which surrounds the moulding cavity (18); and
    heating means for heating the mould to a determined temperature and which are deactivated when the cooling method is implemented,
    characterized in that wherein the mould (12, 14, 16) is cooled by circulating a heat-transfer fluid directly in contact with the external face (20, 28) thereof, and
    wherein the heat-transfer fluid is formed of a pressurized gas which under goes an expansion as the gas circulates against the external face (20, 28) of the mould (12, 14, 16).

2. Method according to claim 1, wherein the means for heating are formed by electrical resistances which are interposed in the thickness of the mould (12, 14, 16) between the moulding cavity (18) and the external face (20, 28).

3. Moulding device (10) for implementing the method according to claim 1, in which:
    the mould (12) is formed by the union of two half-moulds (14, 16) each comprising a union face (26) in which part of the moulding cavity (18) is formed and an opposite external face (28) that forms part of the external face (20) of the mould (12);
    each half-mould (14, 16) is fixed in a housing (40) of an associated support (22, 24) with an empty space (44) reserved between the bottom (42) of the housing (40) and the external face (28) of the half-mould (14, 16);
    wherein the moulding device (10) comprises at least one controlled heat-transfer fluid feed duct (50) which opens into the empty space (44) to allow the heat-transfer fluid to circulate between the external face (28) of the half-mould (14, 16) and the bottom (42) of the housing (40), and
    wherein the means for heating is formed by electrical resistances which are interposed in the thickness of the mould (12, 14, 16) between the moulding cavity (18) and the external face (20, 28).

4. Device (10) according to claim 3, wherein the empty space (44) is open to the atmosphere to allow the heat-transfer fluid to be discharged.

5. Device (10) according to claim 3, wherein the feed duct (50) opens into the bottom (42) of the housing (40).

6. Device (10) according to claim 5, wherein the feed duct (50) comprises several orifices (52) opening into the bottom (42) of the housing (40), the orifices (52) being distributed over the said bottom (42).

7. Device (10) according to claim 5, wherein the feed duct (50) is produced in the thickness of the support (22).

8. Device (10) according to claim 4, wherein the feed duct (50) opens into the bottom (42) of the housing (40).

9. Device (10) according to claim 8, wherein the feed duct (50) comprises several orifices (52) opening into the bottom (42) of the housing (40), the orifices (52) being distributed over the said bottom (42).

10. Device (10) according to claim 6, wherein the feed duct (50) is produced in the thickness of the support (22).

11. Device (10) according to claim 9, wherein the feed duct (50) is produced in the thickness of the support (22).

12. Device (10) according to claim 4, wherein the feed duct (50) is produced in the thickness of the support (22).

13. Device (10) according to claim 12, wherein the feed duct (50) comprises several orifices (52) opening into the bottom (42) of the housing (40), the orifices (52) being distributed over said bottom (42).

14. Device (10) according to claim 6, wherein the feed duct (50) is produced in the thickness of the support (22).

15. Device (10) according to claim 13, wherein the feed duct (50) is produced in the thickness of the support (22).

16. A method for cooling a heated mould of a device for blow-moulding thermoplastic containers, comprising the steps of:
    after heating a mould to a determined temperature, deactivating the heating and commencing a cooling step of cooling the mould, the mould having i) an internal face which delimits a moulding cavity (18) with a hollow cylinder of revolution around a vertical main axis (A), ii) an external face (20, 28) that surrounds the moulding cavity, iii) a support (22, 24) with a housing that surrounds the external face, iv) a space (44) located between the external face of the mould and an interior face of the housing of the support, and v) a heat-transfer fluid feed duct (50) which opens into the space (44) located between the external face of the mould and the interior face of the housing of the support, the cooling step comprising feeding a pressurized gas at a first temperature through the fluid feed duct directly into the space (44) and circulating the gas within the space (44) directly in contact with the external face of the mould,
    wherein the gas is made to undergo an expansion as the gas circulates against the external face of the mould, the expansion of the gas causing a drop in temperature of the gas to a second temperature as the gas circulates against the external face of the mould, the second temperature being lower than the first temperature, and the gas acting as a heat-transfer fluid to cool the external face of the mould.

* * * * *